July 14, 1970     F. B. HUTTO, JR     3,520,410
FILTER CAKE REMOVAL DEVICE FOR ROTARY DRUM FILTER
Filed April 4, 1968     3 Sheets-Sheet 1
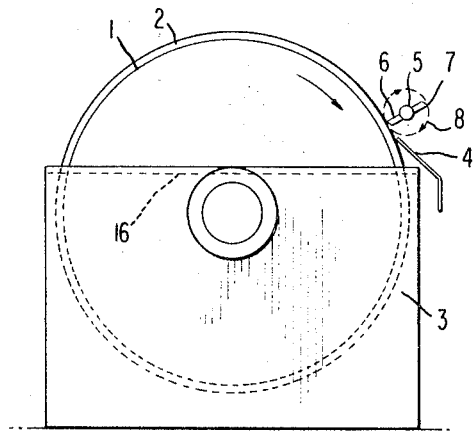
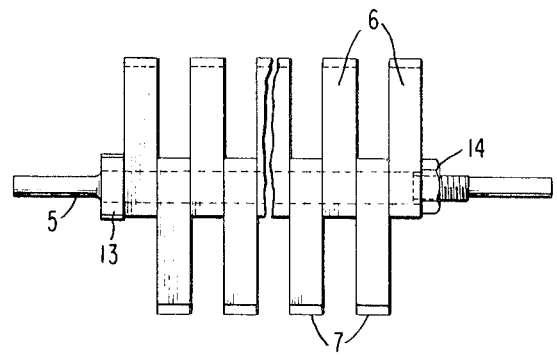
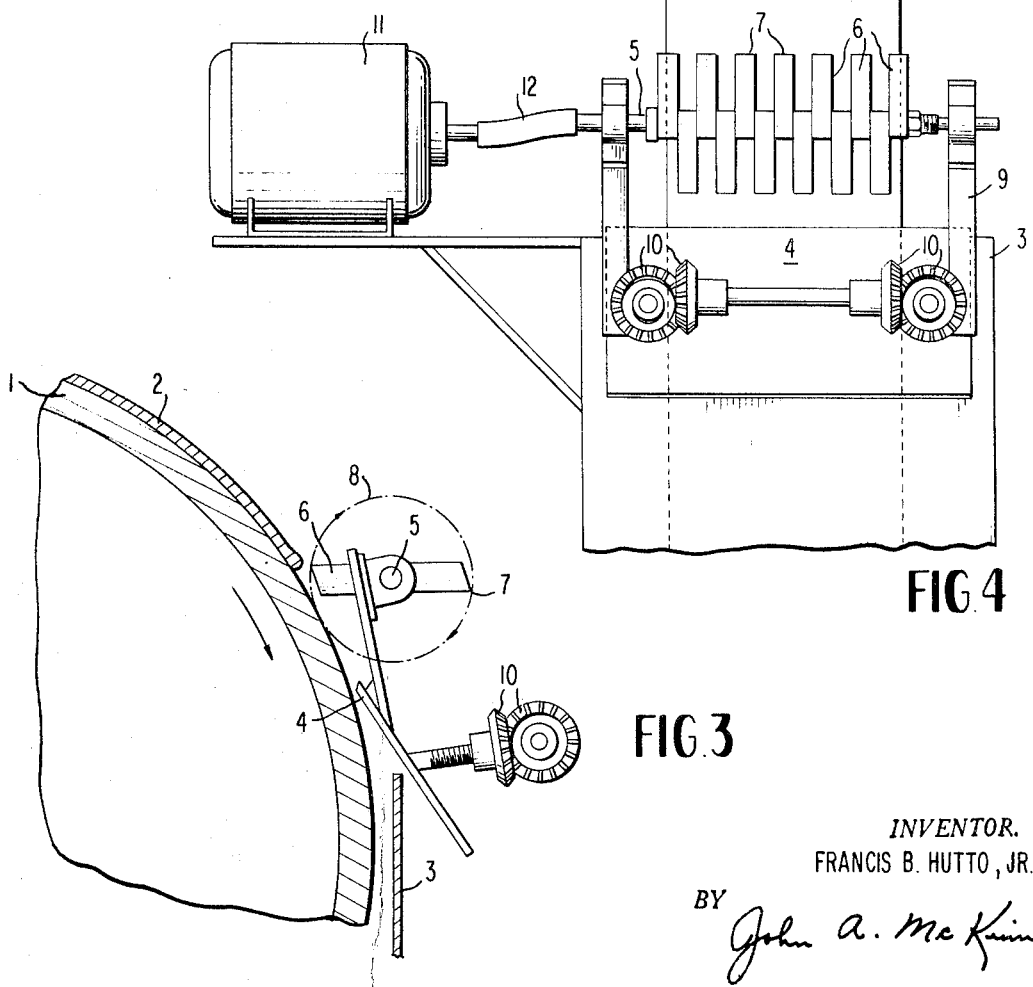
INVENTOR.
FRANCIS B. HUTTO, JR.
BY *John A. McKinney*
ATTORNEY INVENTOR.
FRANCIS B. HUTTO, JR.
BY John A. McKinney
ATTORNEY United States Patent Office 3,520,410
Patented July 14, 1970

3,520,410
FILTER CAKE REMOVAL DEVICE FOR ROTARY DRUM FILTER
Francis Baird Hutto, Jr., Somerville, N.J., assignor to Johns-Manville Corporation, New York, N.Y., a corporation of New York
Filed Apr. 4, 1968, Ser. No. 718,853
Int. Cl. B01d 37/02, 33/36
U.S. Cl. 210—67                                12 Claims

ABSTRACT OF THE DISCLOSURE

A rotary drum filter provided with a novel rotary cutter comprising a plurality of typically chisel-like blades mounted on a revolving shaft for rotation therewith. The blades are arranged in a plurality of angularly spaced rows, at least one blade per row, and adjacent blades are in substantially different rows. The cutter rotates preferably rapidly in preferably a direction opposite to the direction of rotation of the filter drum. This device is particularly useful in filtration of slurries containing fibrous materials such as cellulose or asbestos fibers, for example, the fibers of which normally rapidly accumulate to build-up on the conventional prior art doctor blade thereby rendering such a blade commercially ineffective for cutting off peripheral shavings from a precoat filter cake clogged with such fibrous materials.

This invention relates to a filter cake removal device especially suitable for continuous vacuum filters of the rotary drum type. This device is particularly useful in combination with rotary precoat filters, although its use is not limited thereto.

BACKGROUND

The continuous rotary drum filter has gained wide usage for filtration of a variety of substances. The conventional filter of this type includes a continuously rotating perforated drum which is partially submerged in a slurry. A filter medium covers the surface of the drum. Vacuum applied to the interior of the drum causes the suspended solids in the slurry to deposit as a filter cake on the face of the drum while the slurry liquid is drawn through. The solid filter cake is then removed by a scraper or doctor knife. One of the earliest of filters of this general type is described in Oliver U.S. Pat. No. 919,628, issued in 1909, for example.

A major advance in rotary drum filter technology was achieved with the advent of the rotary precoat filter. In rotary precoat filtration, a layer of a suitable filter aid is typically coated on the surface of a suitable filter medium such as a permeable textile fabric prior to any filtration of the slurry through the filter medium. The precoated filter aid cake makes it possible to filter a number of substances, including particularly pasty, gummy, and colloidal materials, for example, which would otherwise quickly plug-up an uncoated filter medium. This plugging up, or blocking of the permeability, is commonly known in the art as "blinding."

The typical conventional commercial rotary precoat filter combination employs a knife blade which is gradually, slowly, and continuously advanced toward a contacting-surface of a precoated filter cake on a slowly revolving filter drum, for removing both the residual filtered solid and an outer-surface thin portion of the substantially clogged precoat layer of the filter aid impregnated with the residue. While rotary precoat filter operation to a limited degree resembles a short-cycle continuous rotary drum filtration, a rotary precoat filter operation is typically a long cycle semi-continuous process which need be interrupted only when the slicing knife blade reaches a predetermined position at a substantially minimum distance from the surface of the filter medium. The filtration cycle normally must be then interrupted, the knife blade reset at its outermost position, the filter washed clean, a new precoat cake applied, and a new filtration cycle is begun. Representative relatively current-day rotary precoat filters are shown and described in Wieneke Pat. 2,083,887, issued June 15, 1937, and in McBerty et al. Pat. 2,265,386, issued Dec. 9, 1941, for example.

Although the known prior art rotary precoat filter-knife combinations such as discussed above are normally suitable for the cutting of a filter cake clogged with a substantially non-fibrous residue, such prior art combinations have proven to be materially commercially unsatisfactory for the filtration of a fibrous material, such as a slurry of cellulose fibers or of asbestos fibers. Many of the fibers collected on a filter cake normally remain uncut, cling to, and pile-up on the cutting edge of the knife, and the accumulated fibrous pile promptly gouges and packs the revolving surface of the filter cake whereby flow rate of filtrate through the filter medium rapidly and promptly becomes reduced to a major degree. The attempted employment of various means suggested by the prior art failed to overcome the problems discussed above, such as result from the filtration of a fibrous slurry. For example, a lawn-mower type arrangement, and also a revolving bristled brush each failed to prove satisfactory.

THE OBJECTS

An object of this invention is a novel combination of a particular filter-cake moving-cutting means and a filtering means through which a filtrate may be separated from a slurried residue to the other.

Another object is a novel process of use of a particular filter-cake cutting means to cut-off outer surface of a filter cake.

Another object is a novel combination of (1) a particular filter-cake moving-cutting means, (2) a filtering means, and (3) a second cutting means.

Another object is a novel rotary precoat-filter cutting means.

A primary object of this invention is to provide a new type of cutter which will effectively remove fibrous, and other such problem-materials, from the face of a filter cake of rotary drum filter.

Another object is to produce cut cake in a chopped-up condition which is relatively dry and easy to handle by mechanical or pneumatic means.

Another object is a method for economically providing a dry solid fibrous product.

Another object is a novel method for cutting-off a part of a peripheral surface of a filter cake, particularly of a rotary vacuum filter cake containing fibrous materials.

Other objects become apparent from the description which follows.

THE INVENTION

The above objects are fulfilled by the present invention which comprises in combination with preferably a rotary drum filter (which may be either a standard rotary non-precoated filter, or a precoat filter), a rotary cutter for removing filtered material and precoat from a filter medium. This cutter comprises one or more blades and/or cutting edges mounted and/or located in side-by-side spatial relationship on a common shaft for rotation therewith, and arranged in a plurality of angularly displaced rows when employing more than one cutting edge. A non-rotary filter is also contemplated. Since the sides of the supports for the blades and/or cutting edges substantially touch the sides of the adjacent supports, the entire face of the filter cake is cut with each revolution of the cutter. Each row presents a sawtooth pattern of alternating cutting edges and open spaces between any two cutting edges cutting along the same point of contact with the filter cake. In operation, the cutter is preferably rotated rapidly in the direction (1) preferably opposite to the direction of rotation of the filter drum for fibrous materials being filtered, and (2) preferably in the same direction of rotation of the filter drum for sticky material. When used in conjunction with a rotary precoat filter, the rotary cutter is mounted so that it can be moved preferably substantiously continuously inwardly toward the filter drum as filtration progresses. The angle of the leading face of each cutting edge to a common tangent through the point of contact of the cutitng edge at the surface of the filter cake may range from at least greater than about 90 degrees to at least less than 180 degrees, preferably closely approaching 180 degrees; see FIG. 14.

This invention will now be described in further detail with reference to the drawings, in which:

FIG. 1 is a side view of a continuous rotary drum filter employing the cutter of this invention, with details omitted;

FIG. 2 is a front elevational view of the cutter (cutting edges 7, supporting arms 6, and rotating shaft 5) in detail;

FIG. 3 is a detailed sectional view of FIG. 1, of the rotary cutting means of this invention.

FIG. 4 is a front elevational view of the rotary cutting means of this invention, together with a rotating filter drum and means 10 for advancing the cutter toward the rotating drum;

Figure 5:
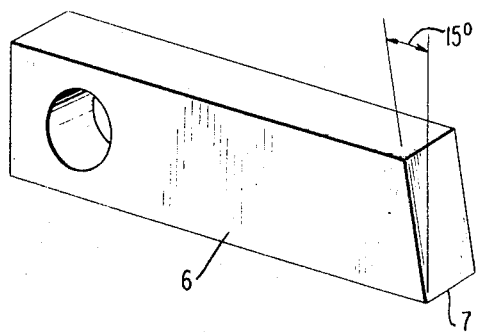
Figure 6:
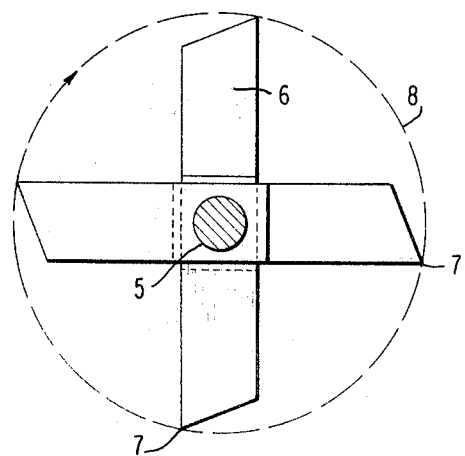
Figure 7:
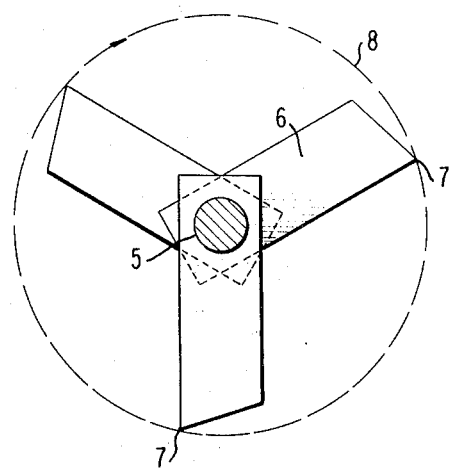

FIG. 5 is an end elevational view of a cutting edge 7 and support therefor, suitable for mounting on a shaft 5 of FIGS. 5, 6, and 7.

Figure 8:
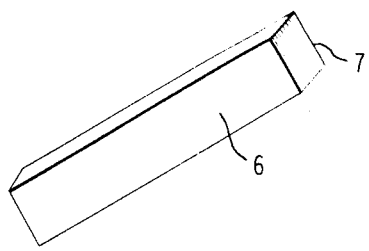
Figure 9:
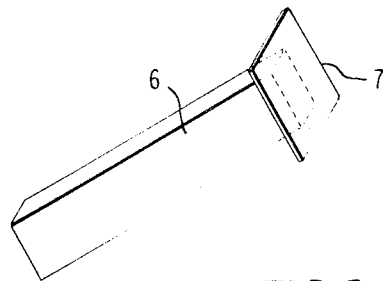

FIGS. 6 and 7 are diagrammatic showings of the blade arrangement according to a modified form of the invention;

FIGS. 8 and 9 illustrate cutting edges which are either a part of the supporting arm 7 (FIG. 8) or alternatively a part of a separate blade attached to the support 6 (FIG. 9).

Figure 10:
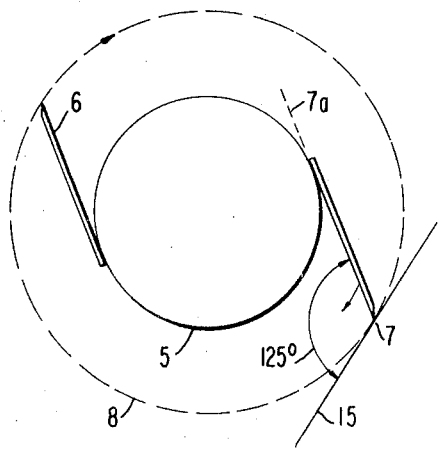
Figure 11:
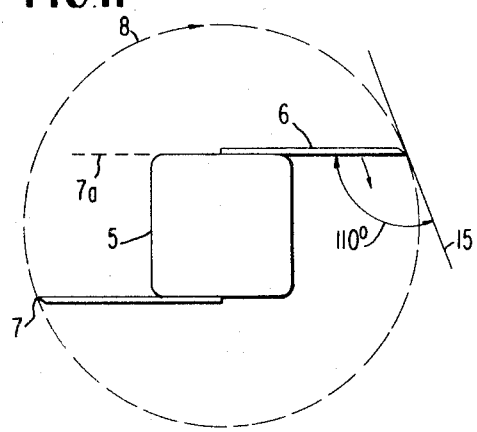
Figure 12:
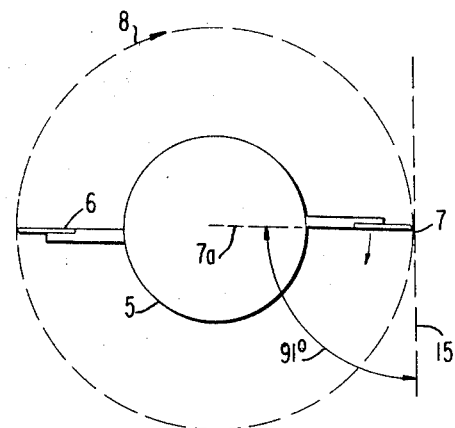

FIGS. 10, 11, and 12 illustrate varying shafts, different type of blades and/or cutting edges, and the employing of different angles of the cutting edge leading face 7a to the common tangent 15.

Figure 13:
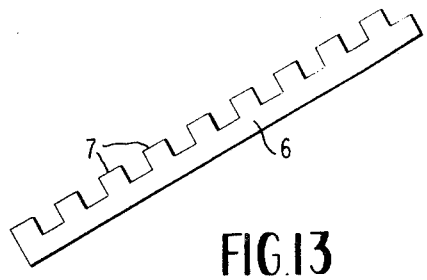

FIG. 13 illustrates a unitary blade having several cutting edges on a common support 6.

Figure 14:
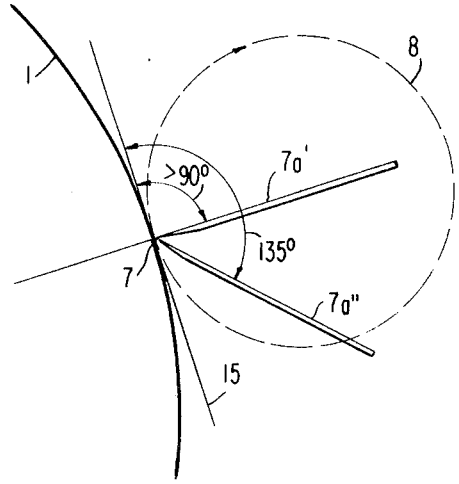

FIG. 14 illustrates the angle of the leading face (7a' or 7a") of the blade of the cutting edge to the common tangent 15 to the rotary filter cake surface 2.

Figure 15:
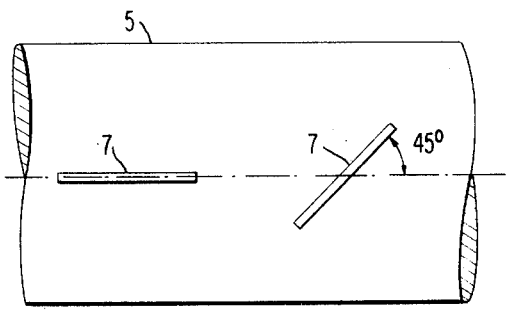

FIG. 15 illustrates typical alternative different arrangements of the angle of the leading face of the cutting edge 7 relative to the shaft 5.

The invention is a combination and a process which effectively overcome the problems discussed above which are encountered when filtering a slurry, such as a fibrous slurry, in which the residue-impregnated filter-cake accumulates and builds up on the cutting edge of a blade normally employed to cut-away the clogged outer-surface of a moving filter bed. The invention is particularly effective in cutting-off outer-surface shavings from a rotary drum type filter cake.

The novel combination includes a rotary cutting means comprising (1) a cutting means and (2) a filtering means. The cutting means has a cutting edge of a normally critical maximum width at the distal end of and/or on the distal end of a support, the cutting edge being mounted horizontally to and extending from a revolvable shaft which extends in a direction which is parallel to the face (surface) of a filtering means, such as a filter bed. In a preferred embodiment, at least one of (1) the shaft of the cutting means and (2) the filtering means are movable, relative to each other, such that the revolving cutting edge may be moved over substantially the entire surface of the filter bed.

In a preferred embodiment of this invention, the filtering means comprises a rotary precoat filter, which as discussed above is a filtering surface and structure suitable for precoating a filter cake thereon which substantially during the filtration process can be gradually shaved-away by the novel cutting edge of this invention. For any particular slurry to be filtered, there is a preferred width of the cutting edge of the rotary blade, ranging up to about ten inches, depending upon the material being filtered. However, for the filtration of fibrous materials, the maximum cutting-edge width becomes critical in order for the inventive combination to be operative, relative to the problems discussed above. For the filtration of a fibrous slurry such as a slurry containing asbestos fibers, the width of the blade may range from a substantially needle-pointed edge up to a critical maximum of about 6 inches, preferably from about ½ inch up to about 1.5 inches.

In the preferred rotary precoat combination, the moving rotary vacuum filter bed may range up to about 16 or more feet in width, the shaft extends over substantially the entire width of the filter bed, and a series of cutting edges are mounted and/or located substantially adjacent to each other along the shaft, with an angle of incidence of any two adjacent cutting edges having a circumferential spacing of at least about one inch, each cutting means being normally substantially perpendicular to the plane of the shaft and being at least about ¼ inch away, preferably at least 0.5 inch, from any cutting edge located along a substantially straight line extending in a horizontal plane axially to the shaft through one or more adjacent cutting edges. Each rotating cutting edge moves preferably at a peripheral speed of from about 314 feet per minute up to about 4,710 feet per minute. A cutting edge 7 at about 0.5 foot distance from the vertex (center of) a shaft rotating at about 100 revolutions per minute results in a surface speed of about 314 feet per minute, for example, the peripheral speed being equal to pi($d$) [i.e., 3.14 times the diameter] times the number of revolutions per minute. Although the above-described combination produces practical and commercially desirable results, another combination includes additionally a conventional cutting edge, for example, of the type employed by prior art methods. However, in this combination, the prior art knife does not significantly function as a primary cutting edge, but merely serves to function (1) somewhat as a scraping-edge to remove residual particles remaining on the new planed filter-cake after the rotary-cutting-means cutting and removal of substantially all of a normally thin outer-surface layer of the rotary filter cake, and (2) possibly also as a cutting edge to cut remaining ragged edges, minor uneven projections, and the like, whereby the rotary-cutting means, the additional subsequent (in contact with the filter cake) cutting edge, and the rotary filter cake effectively function as a unit to produce the desired unitary result discussed above. In a preferred embodiment a knife, or alternatively merely a skirt, does not touch the filter cake but is normally about one-fourth inch away from the filter cake so as to prevent the cuttings (from the rotary cutter) from falling into the filter drum. It has been unexpectedly discovered that not only is the rotary cutting means highly effective in substantially cleanly cutting filter cakes clogged with fibrous materials, but also that the filter cake residues and/or fibrous materials do not accumulate and build-up as on the prior art substantially stationary blade, thereby overcoming a major problem of the prior art. Thereby, a continuous vacuum rotary filter becomes a practical and commercially desirable apparatus.

In addition to the above-described broad embodiments included within the scope of this invention is the combination of the inventive rotary cutting means, in combination with either a rotary or a non-rotary moving filter bed in which the rotary cutting means may, for example, be immersed in the slurry being filtered, whereby the rotary cutting means would additionally serve to agitate the slurry.

In such a substantially-plane moving filter bed, the portion of the filter bed or cake from which a surface layer is to be removed, may be, for example, travelling momentarily above the slurry surface, whereby the rotary cutting means need not be located below the surface of the slurry.

Although the apparatus and process of use of this invention is particularly advantageous for fibrous slurry filtration, they may be also employed to filter other conventional non-fibrous materials.

Referring now to the drawings and especially to FIG. 1, there is shown schematically a continuous vacuum filter having a rotary drum which rotates on a shaft. The filter drum is partially submerged in tank 3, which tank contains a slurry of suspended solids to be filtered. A filter medium 1a and 1b, such as a precoated filter cloth, covers the face of the drum. For purposes of illustrations, the filter drum will be assumed to rotate clockwise, as illustrated in FIG. 1. The filter may be of any conventional continuous rotary drum filter or any rotary precoat filter construction, such as the continuous filter shown in the aforementioned Oliver Pat. 919,628, and preferably a rotary precoat filter such as those shown in the aforementioned Wieneke Pat. 2,083,887 or McBerty et al. Pat. 2,265,386. The invention will be described with particular reference to precoat filters.

A novel rotary cutter collectively referred to as 5, 6, and 7 cuts off the accumulated solids 2 a thin layer of the filter cake on the surface of the rotary drum. A deflector (not shown) receives the filter cake chips and shavings which have been loosened by the cutting 7 as the support 6 for the cutting edge 7 revolves (rotates) along the imaginary line 8 as a result of the rotating shaft 5. The shaft preferably drives the cutting edge 7 in a direction opposite to the direction of rotation of the drum, when filtering fibrous materials.

Referring now to FIG. 2, the supporting arm 6 supports the cutting edge 7, which may be either a part of the supporting arm or alternatively an edge of a cutting means or blade attached to the supporting arm. A plurality of supporting arms 6 and cutting edges 7 are mounted on the common shaft 5 for rotation therewith, and typically may be arranged alternately in a pair of rows spaced 180° apart. Each row has alternating blades and spaces in a sawtooth pattern. The blades 21 typically may be frictionally held between a collar 13 and an internally screw threaded nut 14 so that the cutting edge 7, the supporting arms 6 and the shaft 5 rotate as a unit. The supporting arms 6 are in contact with the adjacent supporting arms on either side, so that the entire face of the filter cake 16 is cut with each complete revolution of the shaft 5.

FIG. 3 is an enlarged section of FIG. 1, but shown in greater detail, for a typical representative embodiment of the rotary cutter of this invention. Additionally shown is a mounting structure where the rotary cutting means including the ratating shaft 5 is attached to (i.e., mounted on) the conventional cutting knife bed 4 which is in turn supported on typically a movable shaft and driving gears collectively designated 10. In FIG. 3, it is more easily illustrated that the rotary blade removes (1) the accumulated solids 2 on the rotating cake and (2) a thin layer of the filter cake designated as 1. As the rotary cutter continually cuts away the surface of the revolving filter cake, the entire rotary cutting apparatus and the conventional knife 4 are gradually and very slowly moved (at normally a continuous and constant rate) fractionally closer to the rotating drum and filter cake until such time as the filter cake has been cut sufficiently thin that the operation must be stopped, and a new filter cake prepared on the rotating drum filter. The rotating filter cake cutter may typically be mounted on the conventional cutting knife 4 so as to move toward the filter cake exactly the same amount as the knife 4 moves; alternatively the rotary cutter may be separately mounted on an independent means for controlling its movement toward the rotary filter cake.

In FIG. 4, it is illustrated that a motor 11 which drives the rotary cutting edges 7 by way of shaft 5 may be connected by a flexible means such as 12. In this embodiment illustrated in FIG. 4, the motor 11 is mounted in a stationary position, as compared to the rotary cutting means which gradually moves toward the rotary filter cake. In other embodiments, not shown, the driving motor may be also mounted on a movable support which also supports the rotating cutting means or alternatively which at least moves toward the rotating filter cake at the same rate so as to prevent stress on a connecting shaft such as 12.

FIG. 5 illustrates a typical cutting edge support 6, this particular embodiment having the cutting edge 7 as a part of the support itself. Similarly, each of FIGS. 6 and 7 illustrate the same type of cutting edge.

Additionally, each of FIGS. 6 and 7 illustrate variations on possible arrangements of cutting edges around the shaft 5, whereby there are a series of cutting edges such as illustrated in FIG. 4. As discussed above, the circumferential spacing between any two consecutive cutting edges must be at least about one inch.

Each of FIGS. 8, 9, 10, 11, 12, and 13, illustrate additional typical embodiments of different types of cutting edges 7 and the supports therefor 6. Additionally, each of FIGS. 10, 11, and 12 illustrate different typical embodiments of cutting edges 7, supporting means 6, and shafts 5 on which the supporting means 6 are mounted. Also, each of FIGS. 10, 11, and 12 illustrate different embodiments which would obtain thereby different angles of leading face of the cutting edge with the common tangent to the filter cake at the point of contact. For example, in FIG. 10, the angle of the leading face of the cututing edge 7 to the common tangent would be about 125 degrees. In FIG. 11, the angle of the tangent 15 to the surface of the filter cake, is about 110 degrees, and in FIG. 12 about 91 degrees.

In FIG. 13, for a support 6 and cutting edges 7 of this type, there would be employed two or more of this embodiment per shaft 5 such as illustrated in FIG. 10, for example, the cutting edges of the second support being so spaced as to cut both portions of the filter cake which would have been left uncut in the spaces between the cutting edges 7 of the first support.

FIG. 14 illustrates the angle of a straight line 7a' or 7a" flush with the face of the cutting edge 7, the angle being measured to the common tangent 15 between the surface of the filter cake 1 and the cutting edge 7.

In order for a cutting edge to cut the surface of the filter cake, an angle of incidence of the moving cutting edge at the point of contact with the filter cake surface must be greater than zero degrees and less than 90 degrees (as measured from a perpendicular to the surface at the point of contact). It is possible to employ a preferred angle of incidence of slightly less than 90 degrees. In other embodiments, the angle of incidence normally is greater than about 45 degrees, and usually greater than about 89 degrees for a rotary vacuum filter. In FIG. 14 the angle of incidence of the cutting edge 7 along the path 8 approximates slightly less than 90 degrees, whereas the angle of the blades 7a' and 7a" as measured from the common tangent is slightly greater than 90 degrees for 7a' and is about 135 degrees for 7a".

To give a realistic understanding of exactly how near 90 degrees the angle of incidence really normally is, it should be noted that the thickness of the surface 2 cut-off (during one pass of a rotary blade) normally approximates about 0.0003 inch. A preferred angle of incidence would be from about 89.000 degrees up to about 89.999 degrees, for example.

FIG. 15 illustrates typical positioning of cutting edges 7 relative to the axis of the shaft 5. All of the blades may have the same relative angle to the shaft, or alternatively, as illustrated in FIG. 15, separate cutting edges may be oriented at differing angles.

Also it should be noted, that although the illustrated embodiments of this invention disclose alternate blades cutting merely that portion of the filter cake left uncut by former blades, it is within the scope of this invention to have consecutive blades somewhat overlapping portions already cut by prior blades (cutting edges). Similarly, it would be within the scope of this invention to employ a single blade less than the width of the portion of the fitler cake to be cut, and to have the cutting edge mounted on a shaft 5 which alternates in an axial direction where by a series of consecutive rotations of the cutting edge, the axially-alternating shaft causes the cutting edges to cut all portions of the filter cake. Similarly, other obvious modifications within the spirit of this invention are included within the scope of this disclosure.

This invention is particularly well suited to the filtration of aqueous slurries of fibrous materials such as asbestos and cellulose, and further illustrations of the process will be made with reference to such materials. The fibrous material is deposited on the precoat filter cake 1a on the rotary drum which is submerged beneath the water line 16 in tank 3, while water is drawn through the filter medium and perforated drum by vacuum normally continuously applied to the interior of the filter. As the rotary drum rotates, this portion of the drum emerges from the tank 3, and the filter cake 1a of filter aid and fibrous material emerged above the liquid surface thereafter is partially dewatered by the continuous application of vacuum while the drum continues to rotate. As the drum continues to rotate, the filter cake surface 2 reaches cutting edges 7 where the filter cake surface is cut away by normally continuous rotation of the cutting edges 7 in a direction which for fibrous material is preferably opposite to the direction of rotation of the drum. For illustration, the drum is shown as rotating clockwise as seen in FIG. 1, while the cutting edges 7 rotate counterclockwise. The filter drum normally rotates quite slowly, as is conventional in the art, while the cutting edges 7 rotate normally very rapidly. For example, excellent results are obtained in separately cutting each of fibrous and sticky materials, with a cutting edge having a circumference of rotation of a diameter of 6 inches and a speed of 1100 r.p.m., and also with a cutter having a rotational-circumferential diameter of 12 inches and a speed of 500 r.p.m. The "peripheral" speeds of the cutting edges 7 (i.e., at the surface of the filter cake) in these two illustrative examples are approximately the same. However, effective removal of filter cake can be obtained at either higher or lower peripheral speeds. In general the speed of a cutter 12 inches in diameter will be from about 100 to about 1500 r.p.m. The cutting edges 7 cut away the filter cake cleanly from the filter drum, and deposit it on preferably a deflector (which may be the flat surface of the conventional knife 4, for example) which directs the cut pieces of filter cake away from the filter drum 10. The cutting edges 7 are capable of taking deep cuts, as much as about a half inch or more, normally up to about one-eighth inch (such as while trimming) into the filter cake without any significant fouling of the blades and without any significant chipping of the filter cake. The nature of the material being filtered would of course largely determine how deep may be the cut without fouling problems. However, as thin a cut as is possible is normally preferred, such as about 0.0003 inch or less, for example, as already discussed above. Remarkably, the rotary cutter of this invention is self-cleaning, so that the cutting edges 7 of the blades do not become coated with fibrous filter cake even when relatively shallow cuts are taken. This is quite surprising since all previously known cutters for precoat filters have become fouled-up quickly when filtering fibrous materials.

The following examples are intended to illustrate merely typical embodiments of this invention, and also to illustrate the lack of success obtained by the substitution of prior art devices for the rotary-blade apparatus of this invention. Accordingly, the illustrated embodiments are not intended to limit the scope of this invention, except to the extent expressly stated in the examples.

EXAMPLE I

A series of experiments were conducted in which the effect of blade width was tested on a rotary-blade apparatus, for cutting a fibrous filter cake containing asphaltic solids, on a rotary vacuum filter. Additionally, experiments were conducted to determine the maximum acceptable distance between the cutting edges of any two blades or more blades operating in the same plane of revolving movement, i.e., the maximum number of revolving blades for cutting the same one-blade-width segment of filter cake.

In the experiments, rotary blades of the type described in FIG. 2 were employed. The width of the cutting edge was varied from ½ inch to 3 inches, with the filter cake being cleanly cut up to about 1.5 inches. Wider blades cut to a less satisfactory degree with the material being tested. The maximum blade width normally may be increased when cutting less-sticky fibrous solids. The rotary blade employing solely one cutting edge per segment of filter cake proved to be highly satisfactory.

Although the minimum spacing between the cutting edges of two or more blades per filter-cake section may be as little as about one inch, it is economically more attractive to employ solely one blade per filter-cake segment since highly satisfactory results are nevertheless obtained employing solely one blade.

Note that based on this experiment, a blade wider than about six inches would not be expected to work satisfactorily.

EXAMPLE II

On the same rotary vacuum filter employed in Example I, a rotary brush was substituted for the rotary blade of this invention, and the apparatus was again placed into operation to determine the results thereby to be obtained. The cutting edges of the brush bristles were about 1/16 inches apart, for any one section of the filter cake being cut by consecutive bristles. The results were totally unacceptable, the fibrous material catching on the bristles. Within a few minutes the brush was "solid," the bristles no longer being readily visible through the entangled fibrous material.

There is no minimum blade width, except that for purposes of economics fewer blades of greater width are less expensive.

While this invention has been described with reference to a specific embodiment thereof, it is understood that this description is by way of illustration and not limitation.

What I claim is:
1. In a rotary vacuum filter having a rotatable drum with a liquid pervious peripheral surface, a precoated filter cake for effecting the filtration of suspended solids from a liquid slurry, a rotary cutting means and driving means for imparting rotary movement to said cutting means, the improvement comprising:
 (a) a plurality of cutting edges mounted on said cutting means for rotation about an axis parallel to the rotational axis of the drum,
 (b) each cutting edge, upon rotation about said axis describing a cylinder,
 (c) the aggregate of said cutting edges upon rotation about said axis describing a longer cylinder of a constant radius congruent with the radii of the cylinders described by each of said cutting edges,
 (d) said longer cylinder having a peripheral surface area occupied entirely by said cutting edges, for intersection with the surface of said filter cake, (e) means for maintaining a predetermined distance between each of said cutting edges, (f) each adjacent cutting edge arranged about said axis to engage the filter cake surface at a different point in time, whereby each cutting edge is positioned to remove from the surface of the filter cake a portion immediately adjacent to a portion previously or subsequently removed thereby achieving a cake of continuous surface and constant thickness.

2. The invention according to claim 1 including additionally means for fractionally and substantially continuously moving said cutting means toward the surface of said filter cake.

3. The invention according to claim 2 in which said cutting edges intersect said filter cake in a direction opposite to the rotational direction of the rotary vacuum filter drum.

4. The invention according to claim 3 in which each cutting edge ranges in width from about ½ inch to about 1.5 inches, in which the leading face of each cutting edge has an angle to a common tangent to said surface of from greater than 90 degrees up to 180 degrees, in which each cutting edge has an angle of incidence of slightly less than 90 degrees, and in which each cutting edge moves at a peripheral speed of from about 314 feet per minute up to about 4,710 feet per minute.

5. The invention according to claim 1 wherein said cutting edges are arranged in at least two groups and intermittently spaced generally along said axis.

6. In a rotary vacuum filter having a rotatable drum with a liquid pervious peripheral surface, a precoated filter cake for effecting the filtration of suspended solids from a liquid slurry, a rotary cutting means and driving means for imparting rotary movement to said cutting means, the improvement comprising:

(a) at least two groups of cutting edges mounted on said cutting means for rotation about an axis parallel to the rotational axis of the drum, (b) each group having a plurality of said cutting edges laterally spaced generally along said axis, (c) each cutting edge upon rotation about said axis describing a cylinder, (d) the aggregate of said cutting edges upon rotation about said axis describing a longer cylinder with a constant radius congruent with the radii of the cylinders described by each of said cutting edges, (e) said longer cylinder having a peripheral surface area occupied entirely by said cutting edges for arcuate intersection with the surface of said filter cake, and (f) means for maintaining a predetermined distance between each of said groups, (g) each group of cutting edges arranged about said axis to engage the filter cake surface at a different point in time, whereby each cutting edge is positioned to remove from the surface of the filter cake a portion immediately adjacent to a portion previously or subsequently removed thereby achieving a cake of continuous surface and constant thickness.

7. The invention according to claim 6 wherein the cutting edges of each group lie in substantially the same plane.

8. The invention according to claim 6 in which said cutting edges are rotated in a direction opposite to the rotational direction of the rotary vacuum filter drum.

9. In a rotary vacuum filter having a rotatable drum with a pervious peripheral surface, a precoated filter cake for effecting the filtration of suspended solids adducted by vacuum, a rotary cutting element and an independently controlled driving means for imparting rotary movement to said cutting element, the improvement comprising:

(a) at least two groups of cutting edges mounted for rotation about an axis parallel to the rotational axis of the drum, and laterally spaced along said axis from adjacent cutting edges of the other group, (b) means for maintaining a predetermined distance between each of said groups, (c) each group of cutting edges being arranged about said axis to engage the filter cake surface at a different point in time and to remove along their respective cutting paths all cake portions not removed along adjacent paths traveled by cutting edges of the other group, whereby each cutting edge is positioned to remove from the surface of said filter cake a portion immediately adjacent to a portion previously or subsequently removed thereby achieving a cake of continuous surface and constant thickness.

10. A process for removing peripheral portions of a filter cake surface in a rotary precoat apparatus, comprising:

(a) causing a plurality of cutting edges to intersect and remove select portions of said cake at a relatively high velocity, (b) each portion being removed at a different point in time from that during which any adjacent portion is removed, (c) the aggregate of the portions of the cake from which the select portions have been removed extending substantially across the filter cake surface to achieve a cake of continuous surface and constant thickness.

11. A process according to claim 10 wherein the filter cake is fibrous in nature and the cutting edges are mounted on a cutting means for rotation about an axis parallel to the rotational axis of a rotary vacuum filter drum.

12. A process according to claim 10 wherein said cutting edges intersect said filter cake in a direction opposite to the rotation direction of said surface.

References Cited

UNITED STATES PATENTS

| | | | |
|---|---|---|---|
| 1,152,303 | 8/1915 | Davidson | 241—221 X |
| 2,265,386 | 12/1941 | McBerty et al. | 210—396 X |
| 2,675,182 | 4/1954 | Wasalaski | 241—221 X |
| 2,827,175 | 3/1958 | Cataldo | 210—396 |
| 2,839,194 | 6/1958 | Lopker et al. | 210—396 X |

SAMIH N. ZAHARNA, Primary Examiner

U.S. Cl. X.R.

210—75, 396